United States Patent
Pust et al.

(10) Patent No.: US 6,661,605 B1
(45) Date of Patent: Dec. 9, 2003

(54) TRANSDUCING HEAD HAVING A REDUCED THERMAL POLE TIP RECESSION

(75) Inventors: Ladislav R. Pust, Savage, MN (US); Edward Murdock, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 260 days.

(21) Appl. No.: 09/839,345

(22) Filed: Apr. 20, 2001

Related U.S. Application Data (60) Provisional application No. 60/221,549, filed on Jul. 28, 2000.

(51) Int. Cl.[7] ................................................. G11B 5/39
(52) U.S. Cl. ....................................... 360/126; 360/317
(58) Field of Search ................................ 360/126, 317, 360/120, 121

(56) References Cited

U.S. PATENT DOCUMENTS

| | | | |
|---|---|---|---|
| 4,853,810 A | 8/1989 | Pohl et al. ................ 360/234.7 |
| 5,021,906 A | 6/1991 | Chang et al. ............. 360/235.1 |
| 5,083,365 A * | 1/1992 | Matsumoto ................ 29/603.12 |
| 5,283,942 A * | 2/1994 | Chen et al. ............... 29/603.18 |
| 5,303,105 A | 4/1994 | Jorgenson ................ 360/294.3 |
| 5,377,058 A | 12/1994 | Good et al. .................... 360/75 |
| 5,636,088 A | 6/1997 | Yamamoto et al. ....... 360/245.1 |
| 5,687,045 A * | 11/1997 | Okai et al. .................. 360/126 |
| 5,710,683 A | 1/1998 | Sundaram ................... 360/126 |
| 5,771,570 A | 6/1998 | Chhabra et al. .......... 29/603.06 |
| 5,793,207 A | 8/1998 | Gill ............................. 324/252 |
| 5,896,243 A | 4/1999 | Koshikawa et al. ...... 360/234.6 |
| 5,896,244 A | 4/1999 | Watanabe et al. ........ 360/234.6 |
| 5,898,542 A | 4/1999 | Koshikawa et al. ...... 360/234.7 |
| 5,909,340 A | 6/1999 | Lairson et al. ............ 360/237.1 |
| 5,949,627 A | 9/1999 | Williams et al. ............ 360/126 |
| 5,991,113 A | 11/1999 | Meyer et al. ................. 360/75 |
| 6,074,566 A | 6/2000 | Hsiao et al. ..................... 216/2 |
| 6,078,455 A | 6/2000 | Enarson et al. ................ 360/68 |
| 6,130,809 A * | 10/2000 | Santini ......................... 360/317 |
| 6,154,952 A | 12/2000 | Tangren ..................... 29/603.04 |
| 6,212,040 B1 * | 4/2001 | Hungerford .................. 360/221 |
| 6,219,200 B1 * | 4/2001 | Waki et al. ................... 360/126 |
| 6,366,428 B1 * | 4/2002 | Yamanaka et al. .......... 360/126 |

* cited by examiner

Primary Examiner—Brian E. Miller
(74) Attorney, Agent, or Firm—Kinney & Lange, P.A.

(57) ABSTRACT

A magnetic head having an air bearing surface, a substrate, a basecoat, a data transducer and a plurality of insulating layers. The basecoat is positioned upon the substrate. The data transducer, which is positioned upon the basecoat adjacent the air bearing surface of the magnetic head, includes a plurality of metallic layers. The plurality of insulating layers are positioned upon the basecoat adjacent the data transducer opposite the air bearing surface of the data transducer. At least one insulating layer of the plurality of insulating layers is substantially coplanar to at least one of the plurality of metallic layers. A portion of the insulating layer is formed of a material having a coefficient of thermal expansion less than a coefficient of thermal expansion of the material forming the substrate.

18 Claims, 5 Drawing Sheets

TRANSDUCING HEAD HAVING A REDUCED THERMAL POLE TIP RECESSION

CROSS-REFERENCE TO RELATED APPLICATION(S)

This application claims the priority from provisional U.S. patent application 60/221,549, filed on Jul. 28, 2000 for "Design and Process of Making Planarized Insulating Layers With Low Thermal Expansion Using Planarization of Material With Larger Thermal Expansion" of Ladislav Pust and Edward Murdock.

BACKGROUND OF THE INVENTION

The present invention relates generally to the field of magnetic data storage and retrieval systems. In particular, the present invention relates to a thin film transducing head having improved performance due to a reduced thermal pole-tip recession.

In a magnetic data storage and retrieval system, a thin film transducing head typically includes a transducer and a substrate upon which the transducer is built. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

The layers of the transducer, which include both metallic and insulating layers, all have differing mechanical and chemical properties than the substrate. These differences in properties affect several aspects of the transducer. First, the layers of the transducing head will be lapped at different rates. Thus, when an air bearing surface (ABS) of the transducing head is lapped during its fabrication, differing amounts of the layers will be removed—resulting in the transducing head having a uneven ABS. Commonly, a greater amount of the metallic layers of the transducer will be removed during the lapping process than will be removed from the substrate. Thus, this lapping process results in a Pole Tip Recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the larger CTE of the transducer's metallic layers, those layers will tend to expand a greater amount than will the substrate. Thus, when the transducing head is subjected to higher operating temperatures, the metallic layers tend to protrude closer to the magnetic disc than the substrate; thereby affecting the PTR of the transducer. This change in PTR caused by temperature is referred to as the Thermal PTR (T-PTR).

During operation of the magnetic data storage and retrieval system, the transducing head is positioned in close proximity to the magnetic media. A distance between the transducer and the media is preferably small enough to allow for writing to and reading from a magnetic medium having a large areal density, and great enough to prevent contact between the magnetic media and the transducer. Performance of the transducer depends primarily on this distance.

To keep the distance between the transducing head and the magnetic media constant, PTR should not change significantly with temperature. If T-PTR is large, then the spacing between the transducer and the medium will change significantly with temperature, thereby requiring that the low-temperature fly height be high enough to accommodate this variation at higher operating temperatures. On the other hand, if T-PTR is close to zero, the low-temperature fly height can be reduced.

BRIEF SUMMARY OF THE INVENTION

A magnetic head has an air bearing surface, a substrate, a data transducer and a plurality of insulating layers. The data transducer, which is positioned upon the substrate adjacent the air bearing surface of the magnetic head, includes a plurality of metallic layers. The plurality of insulating layers are positioned upon the substrate adjacent the data transducer opposite the air bearing surface of the data transducer. At least one insulating layer of the plurality of insulating layers is substantially coplanar to at least one of the plurality of metallic layers. A portion of the insulating layer is formed of a material having a coefficient of thermal expansion less than a coefficient of thermal expansion of the material forming the substrate.

DETAILED DESCRIPTION

Figure 1:
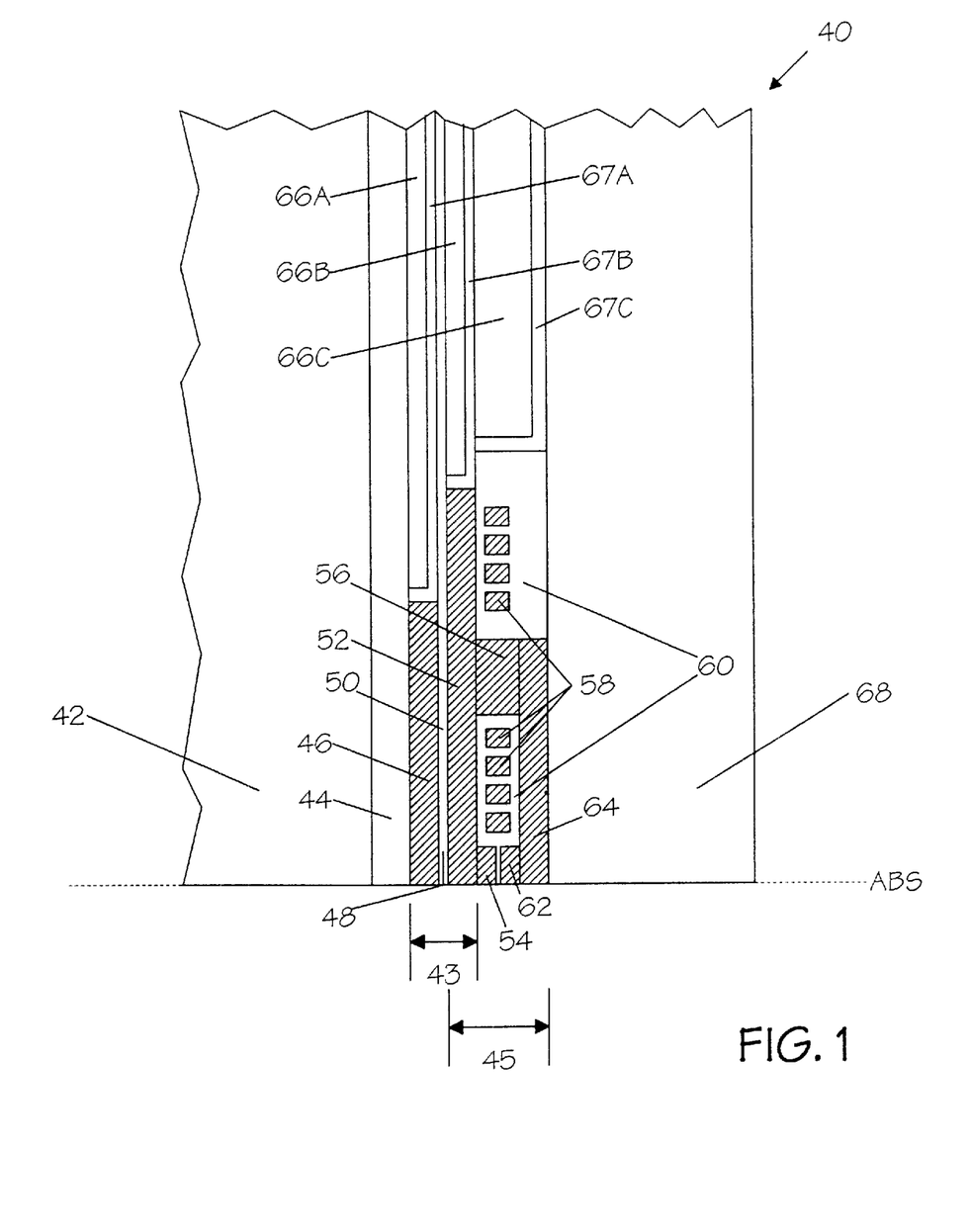
FIG. 1 is a partial cross-sectional view of a transducing head in accord with the present invention.

FIG. 1 is a partial cross-sectional view of transducing head 40 in accord with the present invention. The cross-section of FIG. 1 is taken substantially normal to an air bearing surface (ABS) of transducing head 40.

Transducing head 40 includes substrate 42; basecoat 44; reader 43 (which includes bottom shield 46, read element 48, read gap 50 and shared pole 52); writer 45 (which includes shared pole 52, bottom pole tip 54, back via 56, conductive coil 58, coil insulator 60, top pole tip 62 and top pole 64); insulating layers 66A, 66B and 66C (collectively referred to as insulating layers 66); insulating layers 67A, 67B and 67C (collectively referred to as insulating layers 67) and overcoat 68.

Basecoat 44 is deposited on substrate 42. Reader 43 and writer 45 are each multi-layer devices which are stacked upon basecoat 44 adjacent the ABS of transducing head 40. As shown in FIG. 1, reader 43 is formed on basecoat 44, and writer 45 is both stacked on and merged with reader 43. In other embodiments not illustrated, reader 43 and writer 45 may be arranged in a piggyback configuration (in which layers are not shared between the two elements) and/or writer 45 may be formed on basecoat 44 (with reader 43 being formed on writer 45). Co-planarly positioned with the layers of reader 43 and writer 45, and opposite the ABS of transducing head 40, are insulating layers 66 and 67. Overcoat 68 is formed on writer 45 and on insulating layers 66 and 67.

Substrate 42 is typically formed of an electrically-conductive, ceramic material such as AlTiC, TiC, Si, SiC, $Al_2O_3$, or other composite materials formed of combinations of these materials. Of these materials, AlTiC and TiC have relatively large coefficients of thermal expansion (CTE), typically in the range of about $7.0 \times 10^{-6}/°$ C. to about $8.3 \times 10^{-6}/°$ C., while silicon has a lower CTE, in the range of about $2.3 \times 10^{-6}/°$ C. to about $2.4 \times 10^{-6}/°$ C.

Insulating basecoat 44 is formed on substrate 42. Basecoat 44 is generally formed of an insulating material, such as $Al_2O_3$, AlN, $SiO_2$, $Si_3N_4$, and $SiO_{0-2}N_{0-1.5}$. Generally, the insulating material for basecoat 44 is selected to most closely match the chemical and mechanical properties of the material used as substrate 42. For example, an $Al_2O_3$ basecoat 44 is commonly used in conjunctions with an AlTiC substrate 42, since the two materials have similar CTEs.

Reader 43 is formed on basecoat 44, and includes bottom shield 46, read element 48, read gap 50 and shared pole 52. A read gap is defined on the ABS between terminating ends of bottom shield 46 and shared pole 52. Read element 48 is positioned in the read gap adjacent the ABS. Read gap 50 insulates read element 48 from bottom shield 46 and shared pole 52. Read element 48 may be any of a variety of different types of read elements, such as an anisotropic magnetoresistive (MR) read element or a giant magnetoresistive (GMR) read element. In operation, magnetic flux from a surface of a magnetic media causes rotation of a magnetization vector of MR read element 48, which in turn causes a change in electrical resistivity of MR read element 48. The change in resistivity of read element 48 can be detected by passing a current through read element 48 and measuring a voltage across read element 48.

Writer 45 is formed on reader 43, and includes shared pole 52, bottom pole tip 54, back via 56, conductive coil 58, coil insulator 60, top pole tip 62 and top pole 64. Bottom pole tip 54 and back via 56 are formed on shared pole 52, with bottom pole tip 54 being positioned adjacent the ABS and back via 56 being spaced away from the ABS. A write gap is defined on the ABS between bottom pole tip 54 and top pole tip 62. Top pole 64 is formed over top pole tip 62 and extends from the ABS to back via 56. Conductive coil 58 is positioned in coil insulator 60 between shared pole 52 and top pole 64, wrapping around back via 56, such that the flow of electrical current through conductive coil 58 generates a magnetic, field across the write gap.

Transducing head 40 is a merged-head configuration in which shared pole 52 serves as a top shield for reader 43 and a bottom pole for writer 45. Although not illustrated, transducing head 40 may also be arranged in a piggy-back configuration in which the top shield of reader 43 and the bottom pole of writer 45 are made of separate layers, or in a merged-head configuration in which reader 43 is built upon writer 45.

Each of bottom shield 46, shared pole 52, bottom pole tip 54, back via 56, top pole tip 62 and top pole 64 are formed of metallic materials. Preferably, each of these components is formed of an alloy primarily composed of Fe, Ni and Co. Such metallic alloys typically have large CTEs. For example, $Ni_{79}Fe_{21}$ has a CTE of about $12.2 \times 10^{-6}/°$ C.

Read gap 50 is generally formed of an insulating material such as $Al_2O_3$. Coil 58 is generally formed of an electrically-conductive metal such as copper, gold or silver. Most commonly used is copper, which has a CTE of about $16.5 \times 10^{-6}/°$ C. Coil insulator 60 is generally formed from a cured photoresist having a large CTE, or from other insulating materials, such as AlN, $SiO_2$, and $Si_3N_4$.

Not shown in FIG. 1 are electrical leads and contacts to read element 48 and coil 58. The electrical leads and contacts are typically formed of metals, such as copper, gold or silver, or metallic alloys.

Insulating layers 66 and 67 are positioned in-plane with layers of reader 43 and writer 45 of transducing head 40, opposite the ABS. In the embodiment shown in FIG. 1, insulating layers 66A and 67A form a bi-layer insulating layer positioned in the same plane as bottom shield 46, insulating layers 66B and 67B form a bi-layer insulating layer positioned in the same plane as shared pole 52, and insulating layers 66C and 67C form a bi-layer insulating layer positioned in the same plane as writer 45 (except for shared pole 52).

Insulating layers 66 are preferably formed of an insulating material having a CTE less than the CTE of the material forming substrate 42. Therefore, if substrate 42 is formed of AlTiC, insulating layers 66A–66C are preferably formed of a low-CTE material, such as $Si_3N_4$, AlN, SiC or $SiO_2$. If substrate 42 is formed of Si, the low CTE-material may be $SiO_2$. Insulating layers 67 are preferably formed of an insulating material for which planarization techniques have been perfected, such as $Al_2O_3$. The following table identifies several common insulating materials and their properties. The exact values in the table may vary depending upon processing and manufacturing considerations.

| Material | CTE [$10^{-6}/°$ C.] | Young's Modulus [GPa] | Poisson's Ratio [1] |
| --- | --- | --- | --- |
| AlTiC | 7.9 | 380 | .22 |
| $Al_2O_3$ | 7.8 | 200 | .25 |
| Si | 2.6 | 163 | .22 |
| $Si_3N_4$ | 3.0 | 200 | .25 |
| AlN | 4.3 | 220 | .25 |
| SiC | 4.5 | 410 | .18 |
| $SiO_2$ | 1.0 | 58 | .25 |

Insulating overcoat 68 is formed over top pole 64, exposed coil insulator 60 and insulating layer 67D. Overcoat 68 is typically formed of an insulating material, such as $Al_2O_3$, AlN, $SiO_2$, $Si_3N_3$ and $SiO_{0-2}N_{0-1.5}$.

The layers of transducing head 40 all have differing mechanical and chemical properties. Due to these differing properties, the layers of transducing head 40 will be lapped at different rates. Thus, the lapping of the ABS of transducing head 40 during fabrication results in transducing head 40 having a uneven ABS. Commonly, a greater amount of the metallic layers of transducing head 40 will be removed during the lapping process than will be removed from substrate 42, resulting in a Pole Tip Recession (PTR) of the metallic layers with respect to substrate 42. The PTR of a particular layer is defined as the distance between the air bearing surface of substrate 42 and the air bearing surface of that layer.

The differing mechanical and chemical properties of the layers of transducing head 40 further affect the air bearing surface of transducing head 40 during operation thereof. The coefficient of thermal expansion (CTE) of materials used in forming substrate 42 is typically much smaller than the CTE of materials used in forming the metallic layers of transducing head 40. Due to the larger CTE of the metallic layers, those layers will tend to expand a greater amount than will substrate 42. Thus, when transducing head 40 is subjected to higher operating temperatures, the metallic layers tend to protrude closer to the magnetic disc than substrate 42; thereby affecting the PTR of the metallic layers of transducing head 40. This change in PTR caused by temperature is referred to as the Thermal PTR (T-PTR).

The present invention addresses the problem of T-PTR by using insulating layers 66 to compensate for the high CTE of the metallic layers of transducing head 40. By using a material for insulating layers 66 which has a CTE lower than that of the material used for substrate 42, insulating layers 66 will expand less than substrate 42, thereby compensating for the larger expansion of the metallic layers. Preferably, the T-PTR will remain close to zero, thereby enabling a lower fly height to enhance the performance of transducing head 40.

Planarization techniques have not yet been developed for some low-CTE materials. Thus, insulating layers 67, which are preferably formed of materials for which such techniques have been developed, enable the use of low-CTE materials to compensate for the high CTE of the metallic layers of transducing head 40, while still enabling the planarization of the metallic layers.

Figure 2A:
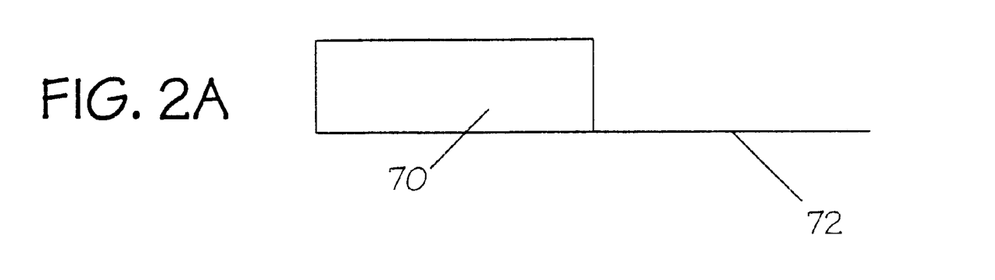
FIGS. 2A–2D illustrate a method in accord with the present invention by which patterned metallic layers of the transducing head of FIG. 1 are formed.

FIGS. 2A–2D illustrate a method in accord with the present invention by which any of the metallic layers of transducing head 40 is formed. First, as shown in FIG. 2A, patterned metallic layer 70 (which is representative of any one of the metallic layers of head 40) is deposited upon underlying surface 72. Metallic layer 70 has been patterned, through use of well-known techniques, to leave portions of underlying surface 72 exposed. To enable planarization, metallic layer 70 is deposited to a thickness greater than desired.

Figure 2B:
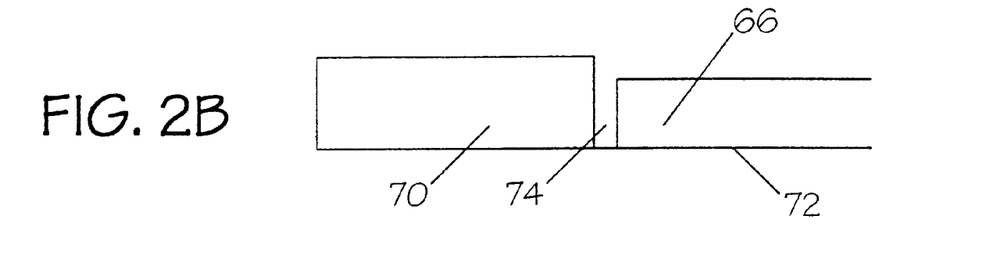

Second, as shown in FIG. 2B, insulating layer 66 is patterned onto exposed underlying surface 72, leaving gap 74 between insulating layer 66 and metallic layer 70. As described above in reference to FIG. 1, insulating layer 66 is preferably formed of a material having a CTE lower than that of the material forming substrate 42 of transducing head 40. A thickness of insulating layer 66 is smaller than a the desired thickness of metallic layer 70.

Figure 2C:
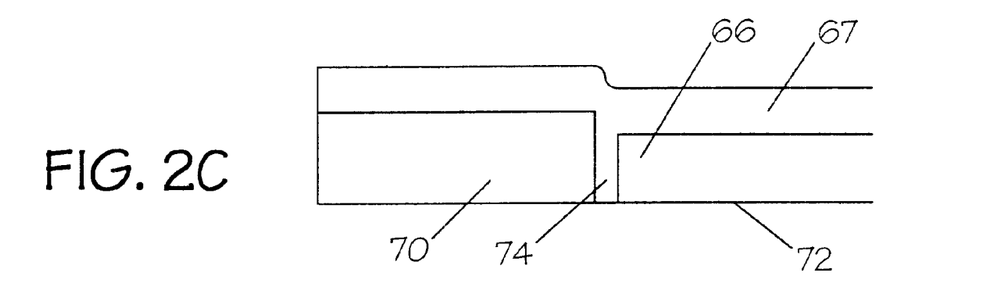

Third, as shown in FIG. 2C, insulating layer 67 is deposited over metallic layer 70 and insulating layer 66. Insulating layer 67 also fills gap 74 between metallic layer 70 and insulating layer 66. As described above in reference to FIG. 1, insulating layer 67 is formed of an insulating material for which planarization techniques are available. A thickness of insulating layer 67 is greater than a difference between the initial thickness of metallic layer 70 and the thickness of insulating layer 66. The narrower gap 74 is between insulating layer 66 and metallic layer 70, the thinner insulating layer 67 need be since less material will be required to completely fill gap 74.

Figure 2D:
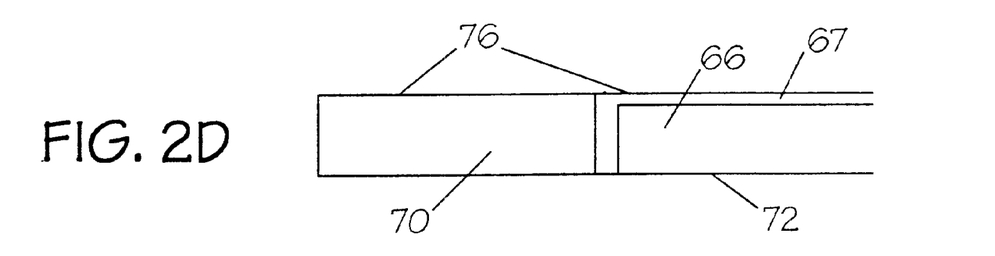

Fourth, as shown in FIG. 8D, the layer formed of metallic layer 70, insulating layer 66 and insulating layer 67 is planarized to a final desired thickness, completely removing insulating layer 67 from above metallic layer 70, and leaving a thin layer of insulating layer 67 above insulating layer 66.

The planarization process is performed using a CMP process which leaves a nearly flat surface 76 upon which subsequent layers may be formed.

By covering insulating layer 66 with insulating layer 67, lower-CTE materials can be used to compensate for the higher-CTE metallic materials, while still allowing for current planarization techniques. These lower-CTE materials will expand less than substrate 42, thereby compensating for the greater expansion of the metallic layers of transducing head 40 and minimizing the effect of T-PTR on transducing head 40. Additionally, because the CMP process is performed only on insulating materials for which CMP planarization has been perfected, greater flexibility in the choice of low-CTE materials is available.

Figure 3:
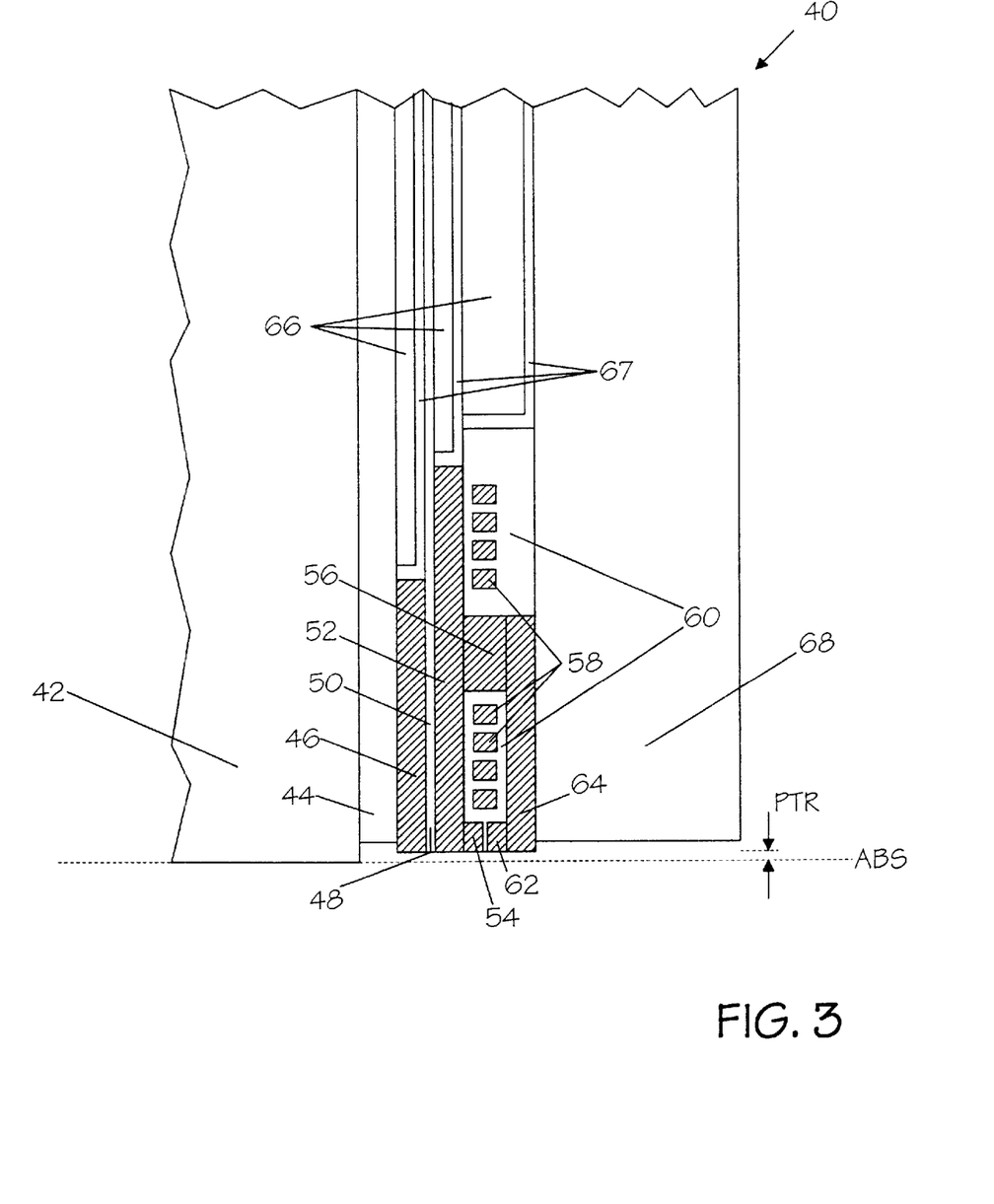
FIG. 3 is a cross-sectional view of the transducing head of FIG. 1 for illustrating the concept of Pole Tip Recession.

FIGS. 3–6 illustrate the concepts of PTR and T-PTR, and their effect on the performance of a transducing head. FIG. 3 is a cross-sectional view of transducing head 40 for illustrating the concept of PTR. As shown in FIG. 3, transducing head 40 is essentially formed of substrate 42, read element 48, a plurality of insulating layers (which include basecoat 44, read gap 50, coil insulator 60, insulating layers 66, insulating layers 67 and overcoat 68) and a plurality of metallic layers (which include bottom shield 46, shared pole 52, bottom pole tip 54, back via 56, conductive coil 58, top pole tip 62 and top pole 64).

The insulating layers and metallic layers of transducing head 40 have differing mechanical and chemical properties than substrate 42. As described above in reference to FIG. 1, these differences in properties cause substrate 42, the insulating layers and the metallic layers to each be lapped at different rates. Thus, the lapping of the ABS of transducing head 40 during fabrication causes transducing head 40 to have a uneven ABS. Commonly, a greater amount of the insulating layers will be removed during the lapping process than will be removed from the metallic layers. Similarly, a greater amount of the metallic layers will be removed during the lapping process than will be removed from substrate 42. Thus, the lapping process results in a recession from the ABS of the insulating layers and the metallic layers of transducing head 40 with respect to substrate 42. The PTR of a particular layer is defined as the distance between the ABS of substrate 42 and the ABS of that layer. For clarity, the magnitude of pole tip recession is exaggerated in FIG. 3.

Figure 4A:
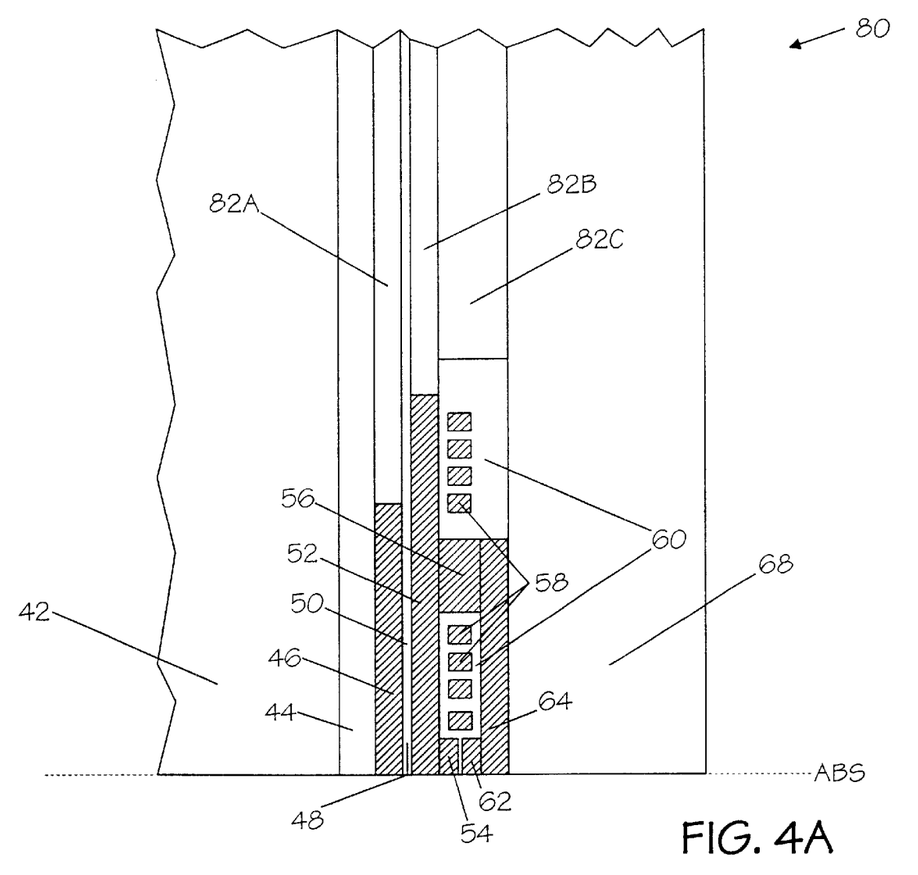
FIG. 4A is a cross-sectional view of a transducing head for illustrating the concept of Thermal Pole Tip Recession.
Figure 4B:
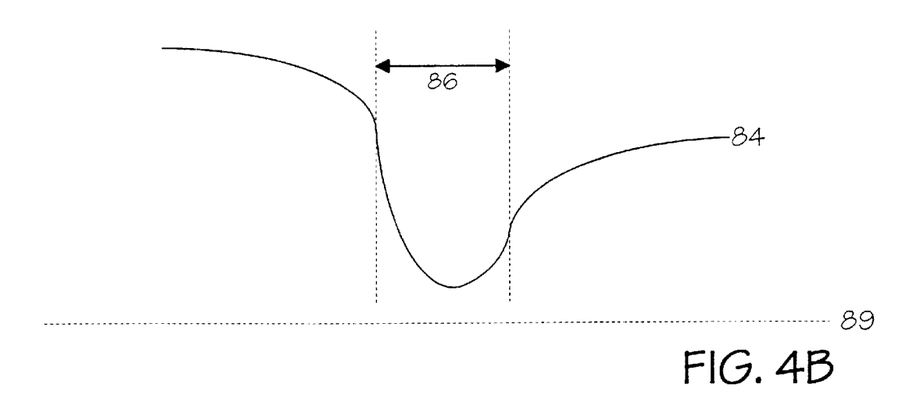
FIG. 4B represents an exaggerated profile of an air bearing surface of the transducing head of FIG. 4A.

FIGS. 4A and 4B illustrate the concept of Thermal Pole Tip Recession on transducing head 80. FIG. 4A is a cross-sectional view of transducing head 80, which is substantially similar to transducing head 40 of FIG. 1, with the exception that insulating layers 67 and 68 of transducing head 40 are replaced with insulating layers 82A, 82B and 82C (collectively insulating layers 82). For that reason, similar elements of FIGS. 1 and 4 are numbered identically. Transducing head 80 is essentially formed of substrate 42, read element 48, a plurality of insulating layers (which include basecoat 44, read gap 50 and coil insulator 60, overcoat 68 and insulating layers 82) and a plurality of metallic layers (which include bottom shield 46, shared pole 52, bottom pole tip 54, back via 56, conductive coil 58, top pole tip 62 and top pole 64). The configuration of the various layers of transducing head 80 is identical to those of transducing head 40 of FIG. 1, except that insulating layers 82 are formed of a material for which planarization techniques have been perfected.

The differing mechanical and chemical properties of the layers of transducing head 80 affect the ABS during its operation. As transducing head 80 is operated, it is subjected to increasing temperatures. In addition, a temperature of transducing head 80, or a part thereof, may be significantly greater than the temperature within the magnetic data storage and retrieval system in which transducing head 80 resides due to heat dissipation caused by electrical currents therein.

The coefficient of thermal expansion (CTE) of materials used in forming substrate 42 is typically much smaller than the CTE of materials used in forming the insulating layers and the metallic layers. Due to their larger CTE, the metallic layers will tend to expand a greater amount than will substrate 42. Thus, when transducing head 80 is subjected to higher operating temperatures, the metallic layers tend to protrude closer to the magnetic disc than substrate 42; thereby affecting the PTR of the metallic layers. This change in PTR caused by temperature is referred to as the Thermal PTR (T-PTR).

The actual amount of T-PTR at a given temperature higher than the ambient temperature is determined by the interplay of the CTE, Young Modulus and Poisson's Ratio of all the materials used in forming transducing head 80. Examples of these values are given in the following table:

| Material | CTE $[10^{-6}/°C.]$ | Young's Modulus [GPa] | Poisson's Ratio [1] |
|---|---|---|---|
| AlTiC | 7.9 | 380 | .22 |
| Aluminum Oxide | 7.8 | 200 | .25 |
| NiFe | 12.2 | 207 | .30 |
| Cu | 16.5 | 117 | .33 |
| Photoresist | 51 | 7 | .40 |

The exact values included in the above table may vary, as they depend upon the particular manufacturing and processing of the material.

FIG. 4B represents an exaggerated profile 84 which illustrates how the greater expansion of the metallic layers over substrate 42 causes the metallic layers in region 86 to come in closer proximity to disc surface 89.

Figure 5:
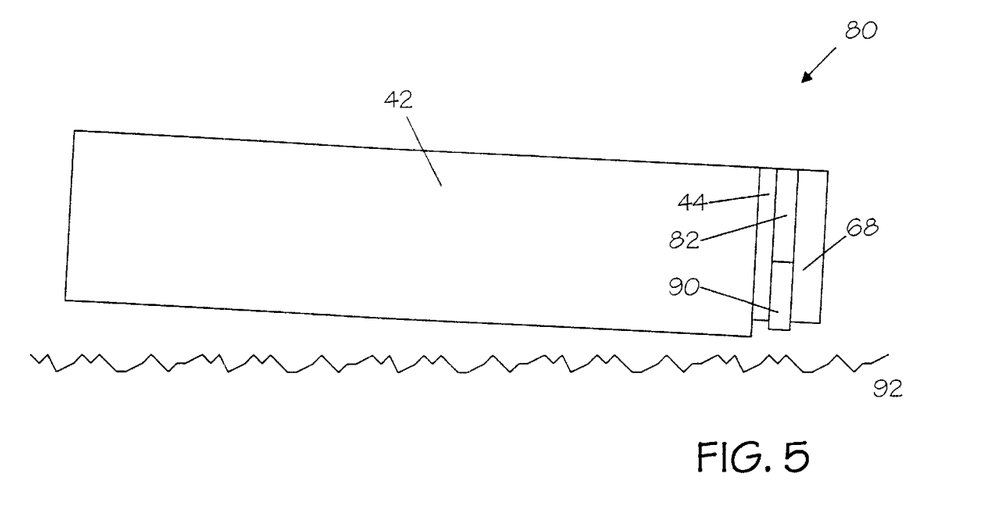
FIGS. 5 and 6 illustrate the effect caused on the fly height of the transducing head of FIG. 4 caused by Thermal Pole Tip Recession.
Figure 6:
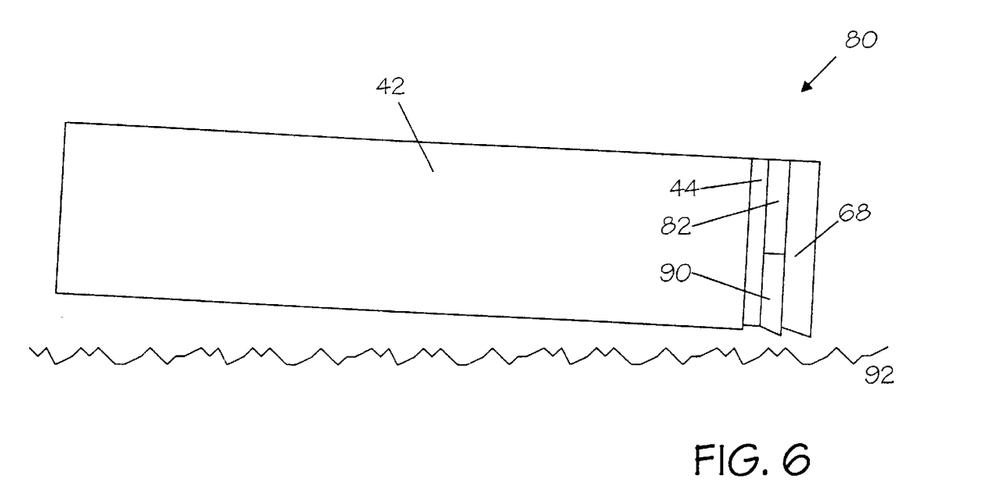

FIGS. 5 and 6 illustrate the effect caused by T-PTR on the fly height of transducing head 80. During operation of a magnetic data storage and retrieval system, transducing head 80 is positioned in close proximity to magnetic media 92. A distance between transducer 90 (formed of reader 43 and writer 45) and media 92 is preferably small enough to allow for writing to and reading from a magnetic medium having a large areal density, and great enough to prevent contact between magnetic media 92 and transducer 90. Performance of transducer 90 depends primarily on this distance. The fly height is primarily determined by the shape of the ABS of the slider upon which transducing head 80 is mounted.

To keep the distance between transducer 90 and magnetic media 92 constant, PTR should not change significantly with temperature. If T-PTR is large, then the spacing between transducer 90 and media 92 will change significantly with temperature, thereby requiring that the low-temperature fly height be high enough to accommodate this variation at higher operating temperatures. On the other hand, if T-PTR is close to zero, the low-temperature fly height can be reduced.

FIG. 5 is a cross-sectional view of transducing head 80 flying above magnetic media 92 at low operating temperatures. At these temperatures, thermal expansion of the layers of transducing head 80 has not affected the performance thereof. As described with reference to FIG. 3, an ABS of transducer 90 (formed of reader 43 and writer 45) is recessed from the ABS of substrate 42, and an ABS of basecoat 44 and overcoat 68 are recessed an even greater amount. For clarity, the magnitude of pole tip recession is exaggerated in FIG. 5.

FIG. 6 is a cross-sectional view of transducing head 80 flying above magnetic media 92 at high operating temperatures. At these higher temperatures, basecoat 44, overcoat 68, insulating layers 82 (which do not incorporate low-CTE insulating layers 66 of FIG. 1) and transducer 90 all expand a greater amount than substrate 42, with transducer 90 expanding the greatest amount. These expansions are caused by the relatively higher CTEs of these layers over that of substrate 42. As shown in FIG. 6, transducer 90 protrudes closer to magnetic media 92 than substrate 42, allowing for a greater likelihood of contact between transducer 90 and magnetic media 92. For clarity, the magnitude of thermal pole tip recession is exaggerated in FIG. 6.

In conclusion, the present invention minimizes the problem of thermal Pole Tip Recession in a transducing head. The combination of low-CTE insulating materials with insulating materials for which planarization techniques are perfected enables the use of low-CTE insulating layers to compensate for the high CTE of the metallic layers of a transducing head, while still allowing the metallic layers to be planarized. By minimizing thermal Pole Tip Recession, the transducing head can be maintained at a lower fly height without risk of contact between the transducing head and the magnetic media. Thus, the present invention greatly improves the performance of the transducing head.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:

a magnetic head having a substrate and a data transducer positioned upon the substrate, the data transducer comprising a plurality of metallic layers, each of the plurality of metallic layers being formed of a material having a coefficient of thermal expansion greater than a coefficient of thermal expansion of a material forming the substrate; and means for compensating for a thermally-caused expansion of at least one metallic layer of the plurality of metallic layers, wherein the means is positioned coplanar to the at least one metallic layer of the plurality of metallic layers, wherein the means is formed of a first layer and a second layer deposited upon the first layer, and wherein the first layer is formed of a material having a coefficient of thermal expansion less than the coefficient of the material forming the substrate.

2. The magnetic data storage and retrieval system of claim 1 wherein the first layer of the means is formed of a material selected from the group consisting of $Si_3N_4$, AlN, SiC, $SiO_2$ and $SiO_{0-2}N_{0-1.5}$.

3. A magnetic head having an air bearing surface and comprising:

a substrate;

a basecoat positioned upon the substrates;

a data transducer positioned upon the basecoat adjacent the air bearing surface, the data transducer comprising a plurality of metallic layers; and a plurality of insulating layers positioned upon the basecoat adjacent the data transducer opposite the air bearing surface of the data transducer, wherein at least one insulating layer of the plurality of insulating layers is substantially coplanar to at least one of the plurality of metallic layers, and wherein a portion of the at least one insulating layer of the plurality of insulating layers is formed of a first layer and a second layer positioned upon the first layer, wherein the first layer is formed of a material having a coefficient of thermal expansion less than a coefficient of thermal expansion of the material forming the substrate.

4. The magnetic head of claim 3 wherein the substrate is formed of a material selected from the group consisting of AlTiC and AlSiC.

5. The magnetic head of claim 4 wherein the first insulating layer is formed of a material selected from the group consisting of $Si_3N_4$, AlN, SiC and $SiO_2$ and $SiO_{0-2}N_{0-1.5}$.

6. The magnetic head of claim 3 wherein the substrate is formed of a material selected from the group consisting of Si and SiC.

7. The magnetic head of claim 6 wherein the first layer is formed of a material selected from the group consisting of $SiO_2$ and $SiO_{0-2}N_{0-1.5}$.

8. The magnetic head of claim 3 wherein the data transducer comprises:
    a bottom shield;
    a top shield;
    a read element positioned adjacent the air bearing surface between the bottom and top shields; and
    a read gap insulator positioned between the bottom and top shields for insulating the read element therefrom.

9. The magnetic head of claim 3 wherein the data transducer comprises:
    a bottom pole;
    a top pole separated from the bottom pole at the air bearing surface by a write gap and in contact with the bottom pole opposite the air bearing surface;
    a conductive coil arranged such that at least a portion of the conductive coil is positioned between the bottom and top poles; and
    a coil insulator positioned between the bottom and top poles for insulating the conductive coil therefrom.

10. The magnetic head of claim 3 wherein the data transducer comprises:
    a bottom shield;
    a shared pole;
    a read element positioned adjacent the air bearing surface between the bottom shield and the shared pole;
    a read gap insulator positioned between the bottom shield and the shared pole for insulating the read element therefrom;
    a top pole separated from the shared pole at the air bearing surface by a write gap and in contact with the shared pole opposite the air bearing surface;
    a conductive coil arranged such that at least a portion of the conductive coil is positioned between the shared and top poles; and
    a coil insulator positioned between the shared and top poles for insulating the conductive coil therefrom.

11. A data transducer fabricated on a substrate and comprising a composite layer, the composite layer comprising:
    an underlayer;
    a metallic layer positioned upon the underlayer, the metallic layer being patterned to leave portions of the underlayer exposed;
    a first insulating layer positioned upon exposed portions of the underlayer, the first insulating layer having a thickness less than a thickness of the metallic layer and a coefficient of thermal expansion less than a coefficient of thermal expansion of the substrate; and
    a second insulating layer deposited upon the first insulating layer, the second insulating layer having a top surface substantially coplanar with a top surface of the metallic layer.

12. The data transducer of claim 11 wherein the first insulating layer is separated from the metallic layer by a gap.

13. The data transducer of claim 12 wherein the gap is filled with an insulating material.

14. The data transducer of claim 13 wherein the insulating material is substantially similar to the material forming the second insulating layer.

15. The data transducer of claim 12 wherein the gap is narrower than a final thickness of the composite layer.

16. The data transducer of claim 11 wherein the substrate is formed of a material selected from the group consisting of AlTiC and AlSiC.

17. The data transducer of claim 16 wherein the first insulating layer is formed of a material selected from the groups consisting of $Si_3N_4$, AlN, SiC, $SiO_2$ and $SiO_{0-2}N_{0-1.5}$.

18. The data transducer of claim 11 wherein the substrate is formed of a material selected from the group consisting of Si and SiC, and the first insulating layer is formed of a material selected from the group consisting of $SiO_2$ and $SiO_{0-2}N_{0-1.5}$.

* * * * *